(12) United States Patent
Nakamori et al.

(10) Patent No.: US 6,692,402 B2
(45) Date of Patent: Feb. 17, 2004

(54) DRIVE CONTROL APPARATUS FOR OIL PUMP

(75) Inventors: Yukinori Nakamori, Anjo (JP); Takehiko Suzuki, Anjo (JP); Satoru Wakuta, Anjo (JP)

(73) Assignee: Aisin AW Co., Ltd. (JP)

( * ) Notice: Subject to any disclaimer, the term of this patent is extended or adjusted under 35 U.S.C. 154(b) by 45 days.

(21) Appl. No.: 10/021,575

(22) Filed: Dec. 19, 2001

(65) Prior Publication Data
US 2002/0091034 A1 Jul. 11, 2002

(30) Foreign Application Priority Data
Dec. 28, 2000 (JP) ........................................ 2000-403474

(51) Int. Cl.[7] .............................. B60K 1/02; F16H 59/64
(52) U.S. Cl. ............................................... 477/3; 477/98
(58) Field of Search ........................... 477/3, 5, 97, 98, 477/72, 76, 156, 157, 159

(56) References Cited

U.S. PATENT DOCUMENTS 6,095,946 A  *  8/2000  Maguire et al. ............... 477/98
6,110,072 A  *  8/2000  Harada et al. ............... 477/157
6,176,808 B1  *  1/2001  Brown et al. ................. 477/5
6,390,947 B1  *  5/2002  Aoki et al. ..................... 477/3

FOREIGN PATENT DOCUMENTS

JP  8-14076  1/1996
JP  2000-73958  *  3/2000

* cited by examiner

*Primary Examiner*—Roger Pang
(74) *Attorney, Agent, or Firm*—Lorusso, Loud & Kelly

(57) ABSTRACT

The present invention provides a drive control apparatus for driving an electric oil pump by supplying it with a predetermined operating voltage so as to decrease a load on the electric oil pump. The drive control apparatus detects a clutch hydraulic pressure supplied to the hydraulic control apparatus for the automatic transmission and drives the electric oil pump so that a required hydraulic pressure is maintained. In this case, the drive control apparatus detects an oil temperature of the hydraulic control apparatus for the automatic transmission, controls the operating voltage of the electric oil pump based on the oil temperature, and supplies the operating voltage to th electric oil pump. Accordingly, the hydraulic pressure supplied from the electric oil pump maintains the hydraulic pressure required for the hydraulic control of the automatic transmission and prevents supply of a greater hydraulic pressure than is required.

5 Claims, 9 Drawing Sheets

|      | C1 | C2 | C3 | B1 | B2 | B3 | B4 | B5 | F1 | F2 |
|------|----|----|----|----|----|----|----|----|----|----|
| N    |    |    |    |    |    |    |    | ○  |    |    |
| 1ST  | ○  |    |    |    |    | △  |    | ○  |    | ○  |
| 2ND  | ○  |    |    | △  | ○  |    |    | ○  | ○  |    |
| 3RD  | ○  |    |    | △  | ○  |    | ○  |    | ○  |    |
| 4TH  | ○  |    | ○  | △  | ○  |    |    |    | ○  |    |
| 5TH  | ○  | ○  | ○  |    |    |    |    |    |    |    |
| REV  |    | ○  |    |    |    |    | ○  | ○  |    |    |

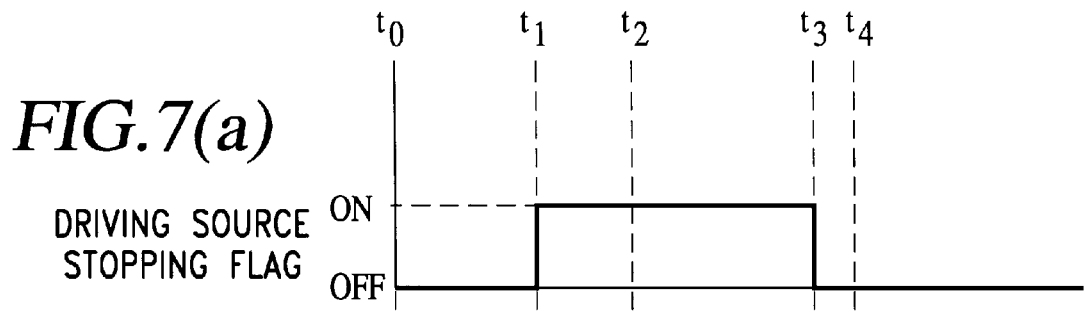
FIG.7(a) DRIVING SOURCE STOPPING FLAG
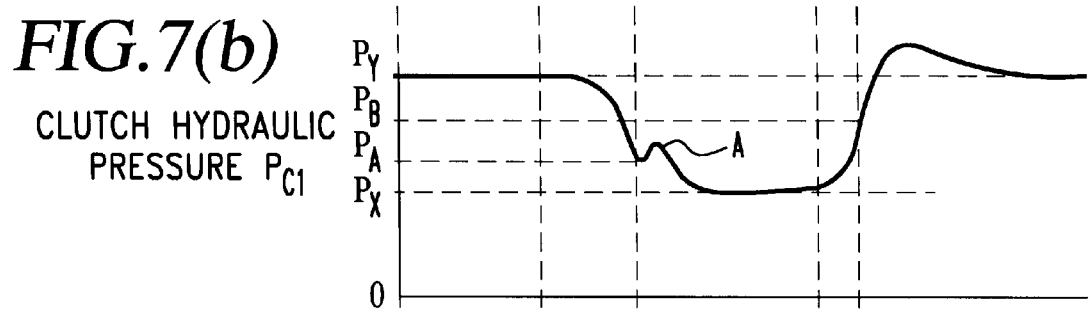
FIG.7(b) CLUTCH HYDRAULIC PRESSURE $P_{C1}$
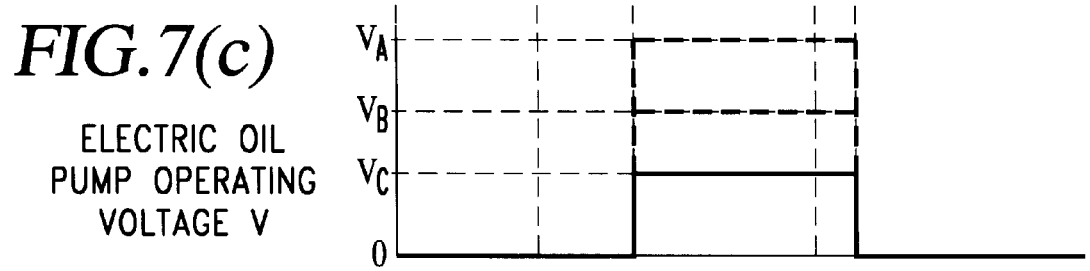
FIG.7(c) ELECTRIC OIL PUMP OPERATING VOLTAGE V

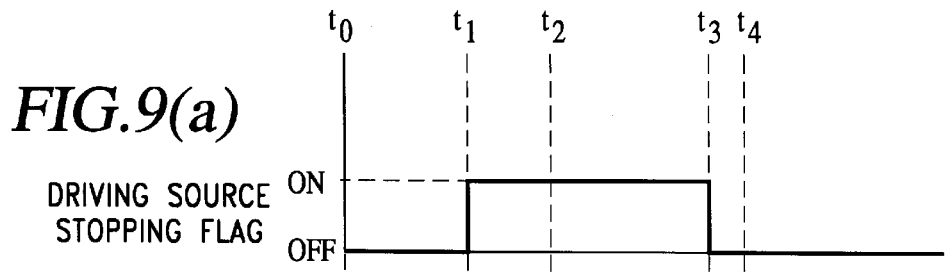
FIG.9(a) DRIVING SOURCE STOPPING FLAG
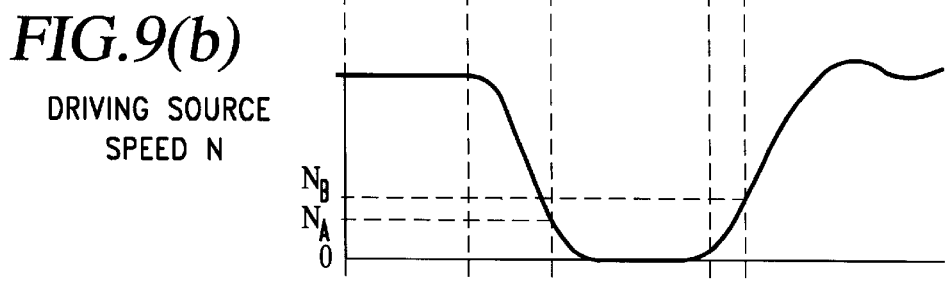
FIG.9(b) DRIVING SOURCE SPEED N
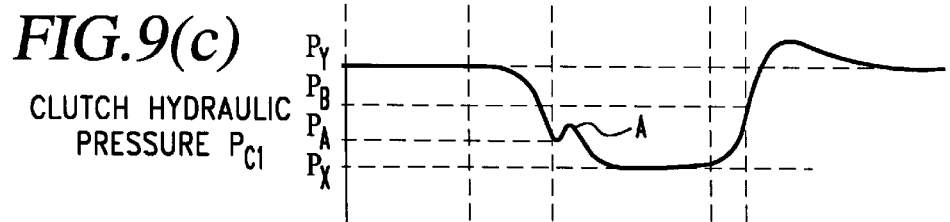
FIG.9(c) CLUTCH HYDRAULIC PRESSURE $P_{C1}$
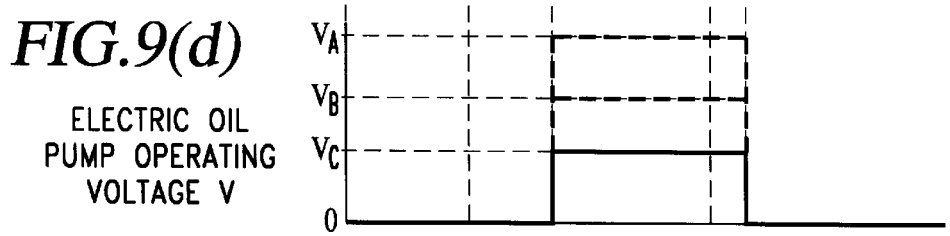
FIG.9(d) ELECTRIC OIL PUMP OPERATING VOLTAGE V

DRIVE CONTROL APPARATUS FOR OIL PUMP

BACKGROUND OF THE INVENTION

1. Field of the Invention

The present invention relates to an apparatus for controlling that supply of hydraulic pressure to a hydraulic controller of an automatic transmission in a vehicle, such as an automobile. Further, the present invention is especially suitable for a hybrid vehicle, and a vehicle performing an idling stop, or the like. More particularly, the present invention relates to an apparatus which controls operating voltage of an electric oil pump which supplies a hydraulic pressure to a hydraulic controller of the automatic transmission, based on oil temperature, when the drive power source of the vehicle is stopped (off).

2. Description of Related Art

Some vehicles such as hybrid vehicles and vehicles which come to an idling stop, automatically stop (turn off) their drive power source (such as an engine and a motor) when the vehicle is stopped (or when predetermined conditions are established) in order to reduce exhaust emissions and improve fuel economy. In these vehicles, a mechanical oil pump for supplying a hydraulic pressure to the hydraulic controller of the automatic transmission, or an automatic transmission mechanism or the like, is mechanically interlocked with the drive power source, and therefore it is stopped when the drive power source is inoperative. When this happens, the hydraulic pressure decreases below that required for controlling clutches to be used for transmitting a drive force. Therefore, when the drive power source is restarted, the clutches are engaged only after the rotational speed of the power source has increased to a level where a shock is generated.

Japanese Patent Application Laid-Open No. 8-14076, for example, discloses a system wherein an electric oil pump is electrically driven by a battery or the like, independently of the drive power source. The system is designed such that, when the mechanical oil pump is stopped, the electric oil pump, which is independent of the drive power source, is driven so as to supply a hydraulic pressure to a hydraulic controller, so that a predetermined hydraulic pressure required for hydraulic control is maintained.

However, as disclosed in the aforementioned patent application, the electric motor for driving the electric oil pump is always operated under a constant voltage. Therefore, a greater hydraulic pressure than is required is generated at some oil temperatures, because of the characteristics of the automatic transmission, change in oil viscosity due to oil temperature or the like. This causes an increase in load on the electric oil pump and the electric motor, thereby increasing the electric power consumption of the electric motor and decreasing the amount of charge of the battery, which may lead to a decrease in operation time of the electric motor. In addition, durability of the electric oil pump and the electric motor is reduced. Furthermore, the electric oil pump must be designed to withstand a greater hydraulic pressure than is required as described above.

SUMMARY OF THE INVENTION

Therefore, it is an object of the present invention to provide a controller for, based on an oil temperature, supplying a determined operating voltage to an electric motor for driving an oil pump, so as to solve the foregoing problems.

BRIEF DESCRIPTION OF THE DRAWINGS

FIG. 7(a) is a time chart for on/off of a drive power source stopping flag versus time;

FIG. 7(b) is a pressure time chart showing clutch hydraulic pressure versus time; and FIG. 7(c) is a voltage time chart showing voltage for the electric oil pump versus time;

FIG. 9(a) is a stop flag time chart showing on/off of a driving power source stopping flag versus time;

FIG. 9(b) is a rotational speed time chart showing drive power source rotational speed versus time;

FIG. 9(c) is a pressure time chart showing clutch hydraulic pressure versus time; and FIG. 9(d) is a voltage time chart showing voltage across the electric oil pump versus time.

DETAILED DESCRIPTION OF PREFERRED EMBODIMENTS

Figure 1:
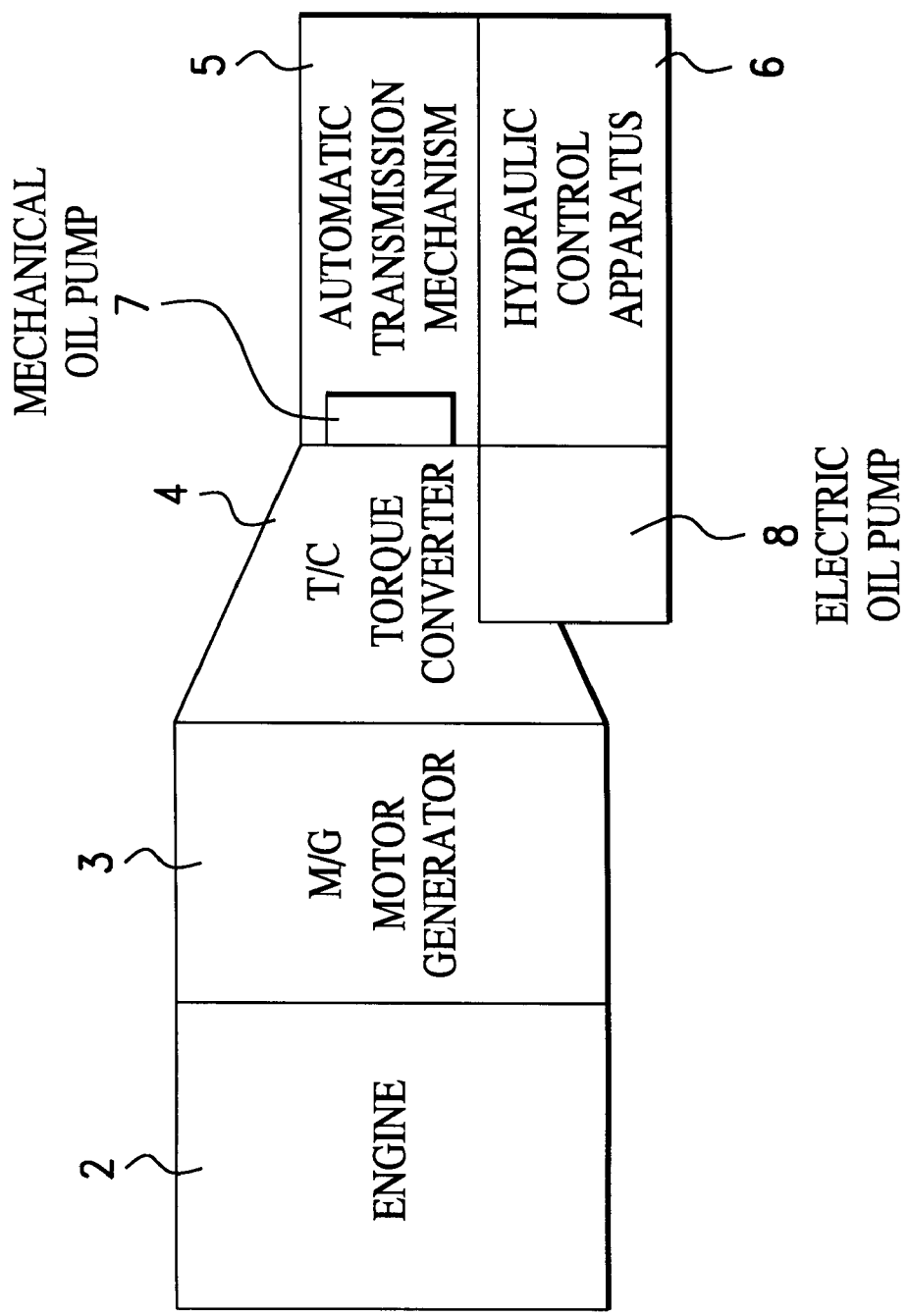
FIG. 1 is a block diagram showing a drivetrain of a vehicle according to the present invention.

An embodiment of the present invention will now be explained with reference to the drawings. FIG. 1, a block diagram showing a drivetrain of a vehicle to which the present invention is applied, shows a drive power source in the form of a combination of an engine 2 and a motor/generator (M/G) 3 which output a driving force to an automatic transmission mechanism 5 through a torque converter (T/C) 4. The automatic transmission mechanism 5 shifts the gear ratio by which the driving force is output to the wheels, etc., responsive to certain vehicle driving conditions. The automatic transmission mechanism 5 is provided with a plurality of friction engagement elements for a shift change, and a hydraulic controller 6 for performing the shift change by hydraulically controlling engagement/ release of the friction engagement elements, and for controlling the torque converter 4. Moreover, the automatic transmission mechanism 5 is provided with a mechanical oil pump 7 and an electric oil pump 8 for supplying hydraulic pressure to the hydraulic controller 6. The mechanical oil pump 7 is interlocked with the torque converter 4 so as to be driven by the engine 2 and the motor/generator 3. On the other hand, the electric oil pump 8, which is independent of the driving force of the engine 2 and the motor/generator 3, is driven by a motor which receives electric power from a battery which will be described later in detail.

Next, the automatic transmission mechanism will be explained referring to FIGS. 2(a) and 2(b). As shown in FIG.

2 (*a*), a primary automatic transmission mechanism 30, disposed on a first shaft which is aligned with an engine output shaft, has an input shaft 37 to which the driving force is transmitted from the engine 2 (E/G) and the motor/generator (M/G) 3, through torque converter 4 having a lock-up clutch 36. The first shaft carries, in order, the mechanical oil pump 7 and the electric oil pump 8 adjacent to the torque converter 4, a brake section 34, a planetary gear section 31, and a clutch 35.

The planetary gear section 31 includes a simple planetary gear unit 32 and a double pinion planetary gear unit 33. The simple planetary gear unit 32 is formed by a sun gear S1, a ring gear R1, and a carrier CR that supports a pinion P1 meshed with these gears, while the double pinion planetary gear unit 33 is formed by a sun gear S2, a ring gear R2, a carrier CR that supports a pinion P2 meshed with the sun gear S1 and a pinion P3 meshed with the ring gear S2 in such a manner that both pinions are meshed with each other. Further, the sun gear S1 and the sun gear S2 are each rotatably supported by hollow shafts that, in turn, are rotatably supported by the input shaft 37. Moreover, the carrier CR is shared by both planetary gear units 32, 33, and the pinion P1 and the pinion P2 meshed with the sun gears S1, S2, respectively, are connected to each other so as to rotate integrally.

The brake section 34 includes a one-way clutch F1, a brake B1, and a brake B2. A counter drive gear 39 is splined to the carrier CR. Furthermore, a one-way clutch F2 is disposed within the circumference of the ring gear R2, and a brake B3 is interposed between the outer circumference of the ring gear R2 and the case. The clutch section 35 is provided with a forward clutch C1 disposed around the circumference of the ring gear R1, and a direct clutch C2 interposed between an inner circumferential surface of a movable member, not shown, and a flange fixed to an end of the hollow shaft.

A secondary transmission mechanism 40 is disposed on a second shaft 43 arranged in parallel with the first shaft, i.e., the input shaft 37. The first shaft, the second shaft and a third shaft formed by differential axles (left and right axles) 45*l*, 45*r* are triangular when viewed from the side. And the secondary transmission mechanism 40 includes simple planetary gear units 41, 42. The carrier CR3 is integrally coupled to a ring gear R4, and sun gears S3, S4 are integrally coupled to each other so as to form a Simpson type gear train. Furthermore, a ring gear R3 is coupled to a counter-driven gear 46 to form an input section, and the carrier CR3 and the ring gear R4 are coupled to a deceleration gear 47 that serves as an output section. Furthermore, a UD direct clutch C3 is interposed between a ring gear R3 and the integrated sun gears S3, S4, and the sun gear S3 (S4) may be braked by a brake B4 as necessary, and the carrier CR4 may be braked by a brake B5 as necessary. Consequently, the secondary transmission mechanism 40 can provide three forward speeds.

A differential apparatus 50 that forms the third shaft has a differential case 51, and a gear 52 meshed with the deceleration gear 47 is secured to the differential case 51. Furthermore, inside the differential case 51, a differential gear 53 and left and right side gears 55, 56 are meshed with each other and are rotatably supported, and left and right axles 45*l*, 45*r* extend from the left and right side gears. Consequently, rotation of the gear 52 is branched corresponding to a load torque, and transmitted to left and right front wheels through the left and right axles 45*l*, 45*r*.

Next, operation of the automatic transmission mechanism 5 will be explained referring to the table of operations shown in FIG. 2(*b*). In a first speed (1ST) state, the forward clutch C1, the one-way clutch F2, and the brake B5 are engaged. This causes the primary transmission mechanism 30 to be in first speed, and the decelerated rotation is transmitted to the ring gear R3 in the secondary transmission mechanism 40 through counter gears 39, 46. The secondary transmission mechanism 40, in which the carrier CR4 is stopped by the brake B5, is in a first speed state, and decelerated rotation of the primary transmission mechanism 30 is further decelerated by the secondary transmission mechanism 40, and transmitted to the axles 45*l*, 45*r* through the gears 47, 52 and the differential apparatus 50.

In a second speed (2ND) state, both the forward clutch C1 and the brake B-2 are engaged, and there is a smooth shift from the one-way clutch F2 to the one-way clutch F1. This causes the primary transmission mechanism 30 to shift to a second speed. Meanwhile, the secondary transmission mechanism 40 is in the first speed state with the brake B5 being engaged. Thus, by the combination of the second speed state of the primary transmission mechanism 30 and the first speed state of the secondary transmission mechanism 40, second speed can be obtained in the automatic transmission mechanism 5 as a whole.

In third speed (3RD), the state of the primary transmission mechanism 30, in which the forward clutch C1, the brake B-2, and the one-way clutch F1 are engaged, is similar to the aforementioned second speed state. A brake B4 is engaged in the secondary transmission mechanism 40. Then, the sun gears S3, S4 are secured, and the rotation of the ring gear R3 is output from the carrier CR3 as the second speed rotation. Consequently, by the combination of the second speed state of the primary transmission mechanism 5 and the second speed state of the secondary transmission mechanism 40, third speed can be obtained in the automatic transmission mechanism 5 as a whole.

In fourth speed ($4^{TH}$), the state of the primary transmission mechanism 30, in which the forward clutch C1, the brake B-2, and the one-way clutch F1 are engaged, is the same as in the aforementioned second and third speed states. In the secondary transmission mechanism 40, the brake B4 is released and the UD direct clutch C3 is engaged. In this state, the ring gear R3 is coupled to the sun gear S3 (S4), creating a direct coupling rotation in which both planetary gear units 41, 42 rotate integrally. Consequently, by the combination of the second speed state of the primary transmission mechanism 5 and the direct connection (third speed) of the secondary transmission mechanism 40, fourth speed rotation can be obtained in the automatic transmission mechanism 5 as a whole.

In fifth speed (5TH), the forward clutch C1 and the direct clutch C2 are engaged, and rotation of the input shaft 37 is transmitted to both the ring gear R1 and the sun gear S1. This causes the primary transmission mechanism 30 to become in a directly connected state in which the gear unit 31 rotates integrally. Meanwhile, the secondary transmission mechanism 40 is in a direct rotation state in which the UD direct clutch C3 is engaged. Consequently, by the combination of the third speed state (direct connection) of the primary transmission mechanism 5 and the direct connection (third speed) of the secondary transmission mechanism 40, fifth speed rotation can be obtained in the automatic transmission mechanism 5 as a whole.

In reverse (REV), the direct clutch C2 and the brake B3, as well as the brake B5 are engaged. In this state, reverse rotation is output from the primary transmission mechanism 30, while the secondary transmission mechanism 40 is held in the first speed state, with the carrier CR4 also stopped in the reverse rotational direction by the brake B5. Consequently, by the combination of the reverse rotation of the primary transmission mechanism 5 and the first speed rotation of the secondary transmission mechanism 40, reverse, decelerated rotation can be obtained.

Figures 2A, 2B:
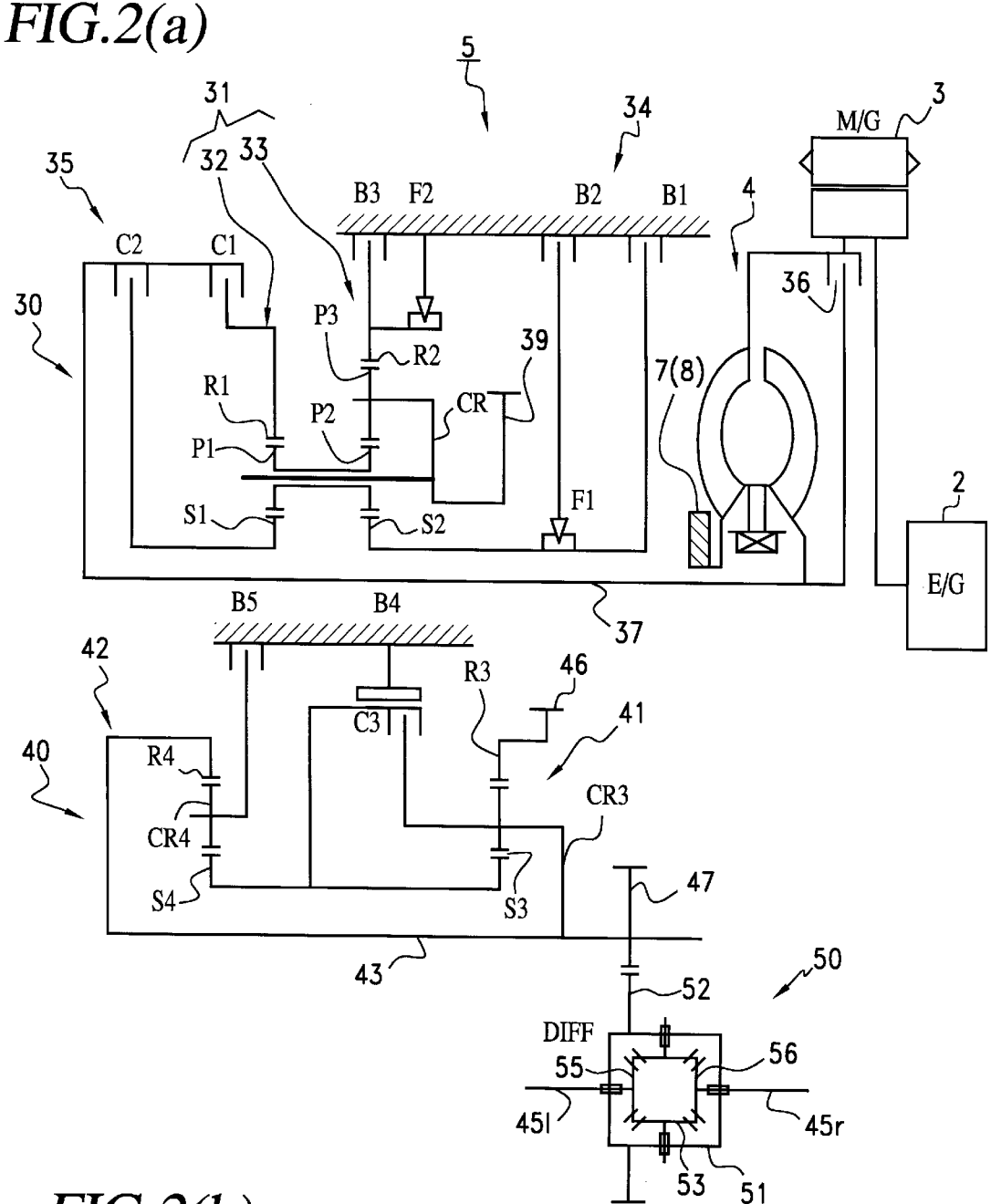
FIG. 2(a) is a skeletal view of an automatic transmission mechanism according to the present invention and FIG. 2(b) is a table of operations thereof.

In FIG. 2(b), a triangle mark indicates that the engagement elements are operated during engine braking. That is, in first speed, the brake B3 is engaged to secure the ring gear R2, in place of the one-way clutch F2, while in second speed, third speed, and fourth speed, the brake B1 is engaged to secure the sun gear S2, in place of the one-way clutch F1.

Next, the hydraulic controller 6 will be explained with reference to FIG. 3 which is a partial schematic view of a hydraulic circuit of the hydraulic controller 6, with only the elements necessary for explaining the present invention shown. It should be noted that the actual hydraulic circuit is much more complicated and includes more elements.

Figure 3:
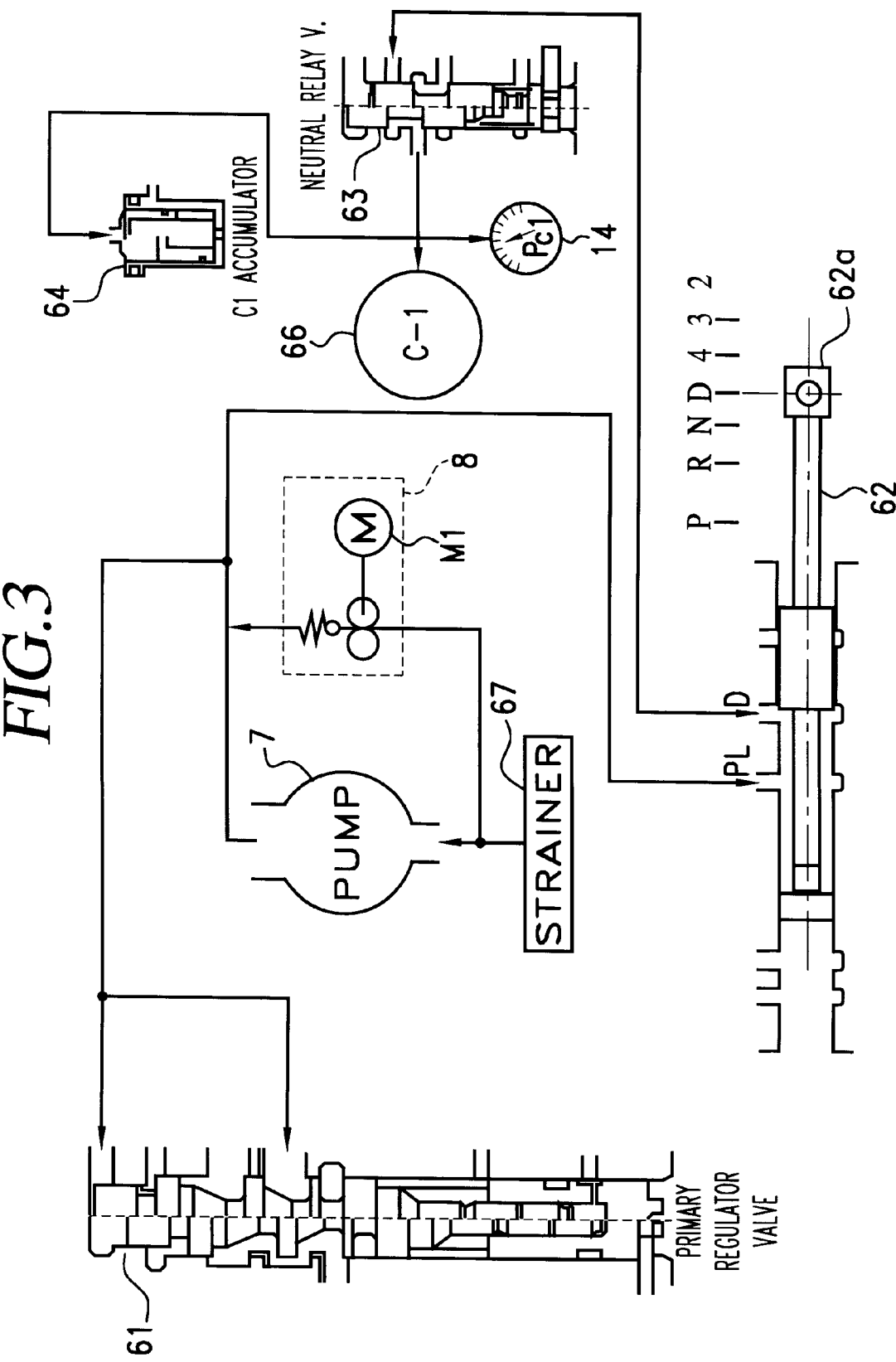
FIG. 3 is a partial schematic view of a hydraulic circuit of the hydraulic controller.

As shown in FIG. 3, a gear or the like (not shown) in the mechanical oil pump 7 is driven by the aforementioned engine 2 and the motor/generator 3. Then, the mechanical oil pump 7 discharges oil to the automatic transmission (hereafter referred to as "ATF") which it intakes through a strainer 67, and supplies it to a primary regulator valve 61, where the pressure is regulated to a line pressure. Next, the line pressure is supplied to a manual shift valve 62 or the like. The electric oil pump 8 shown by a dashed line in the drawing is driven by a motor M1. The electric oil pump 8 intakes ATF through the strainer 67, and discharges the ATF as a hydraulic pressure to the primary regulator valve 61 and the manual shift valve 62 or the like in a similar manner. That is, hydraulic pressure can be supplied to the primary regulator valve 61 and the manual shift valve 62 by one, or both, of the mechanical oil pump 7 and the electric oil pump 8. The primary regulator valve 61 also communicates with the other valves through a hydraulic circuit (not shown).

On the other hand, for example, when a manual shift lever 62a is shifted to a drive range (D), a manual shift valve 62 is brought into communication with a neutral relay valve 63 so as to supply hydraulic pressure thereto. The neutral relay valve 63 is in communication with a hydraulic pressure actuator 66 for the clutch C1 and an accumulator 64 for the clutch C1 so as to supply a hydraulic pressure thereto and thereby control engagement of the clutch C1. Further, an oil passage in communication with the hydraulic pressure actuator 66 for the clutch C1 is provided with a hydraulic pressure sensor 14 and an oil temperature sensor 13, to detect, respectively, clutch hydraulic pressure (hydraulic pressure on the hydraulic control apparatus) $P_{C1}$ and temperature of the ATF (oil temperature) for engaging the clutch C1.

Figure 4:
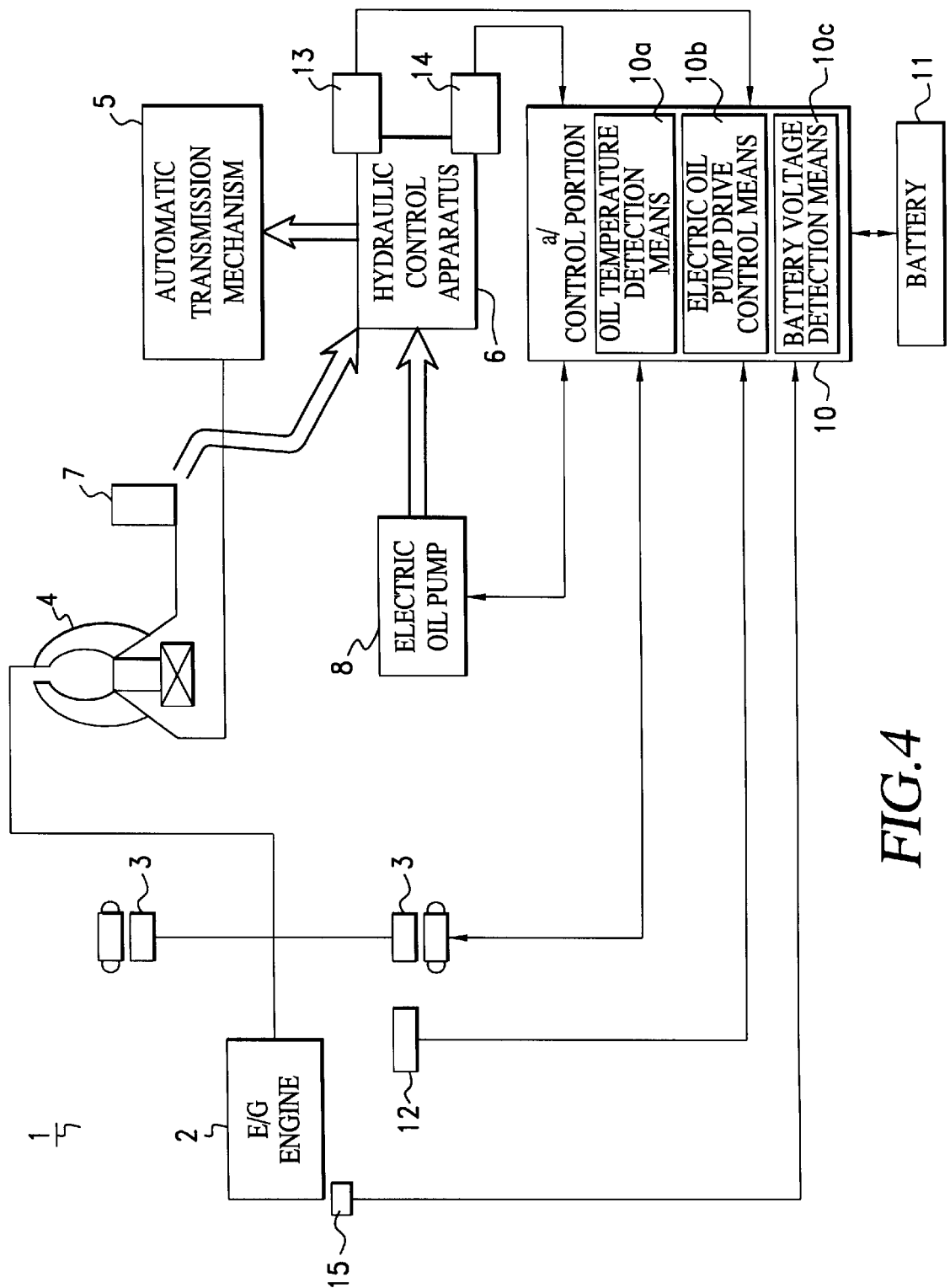
FIG. 4 is a block diagram of a control apparatus according to the present invention.

Next, the control apparatus according to the present invention will be explained referring to FIG. 4. As shown in FIG. 4, the engine 2 and the motor/generator 3 are connected with each other such that the motor/generator 3 can be driven by the engine 2 and, conversely, the engine 2 can be driven by the motor/generator 3. The system is also arranged so that the driving force may be that of the engine 2 alone, that of the motor/generator 3 alone, or a combination of both at the same time. The driving force is then input into the torque converter 4 and, from the torque converter 4 into the automatic transmission mechanism 5, where it undergoes a shift change, and then output to wheels, not shown. Moreover, as described above, the mechanical oil pump 7 and the electric oil pump 8 are constructed so as to supply a hydraulic pressure to the hydraulic controller 6 provided in the automatic transmission mechanism 5. The hydraulic controller 6 is provided with the oil temperature sensor 13 and the hydraulic pressure sensor 14.

The control apparatus 1 includes a control section 10. The control section 10, which is connected with the motor/generator 3, the electric oil pump 8, and the battery 11 in such a manner that input and output are freely made therebetween, can detect and control their individual operations. The control section 10 is connected with an engine rotational speed sensor 15 for detecting rotational speed of the engine 2, a magnetic pole position detection sensor 12 for detecting the rotational speed of the motor/generator 3, the oil temperature sensor 13, and the hydraulic pressure sensor 14. Moreover, the control section 10 is provided with oil temperature detection means 10a, electric oil pump drive control means 10b, and battery voltage detection means 10c. The oil temperature detection means 10a detects oil temperature T of the hydraulic controller 6 based on the signal from the oil temperature sensor 13. The electric oil pump drive control means 10b supplies the motor M1 with an operating voltage V for operating the electric oil pump 8 (hereafter referred to as an "operating voltage") determined based on the temperature detected by the oil temperature detection means 10a, and drives or stops the oil pump 8 based on the hydraulic pressure detected by the hydraulic pressure sensor 14 or a driving power source rotational speed N of the driving power source detected by the magnetic pole position detection sensor 12 and the engine rotational speed sensor 15. Further, the battery voltage detection means 10c detects voltage of the battery 11.

Figure 5A:
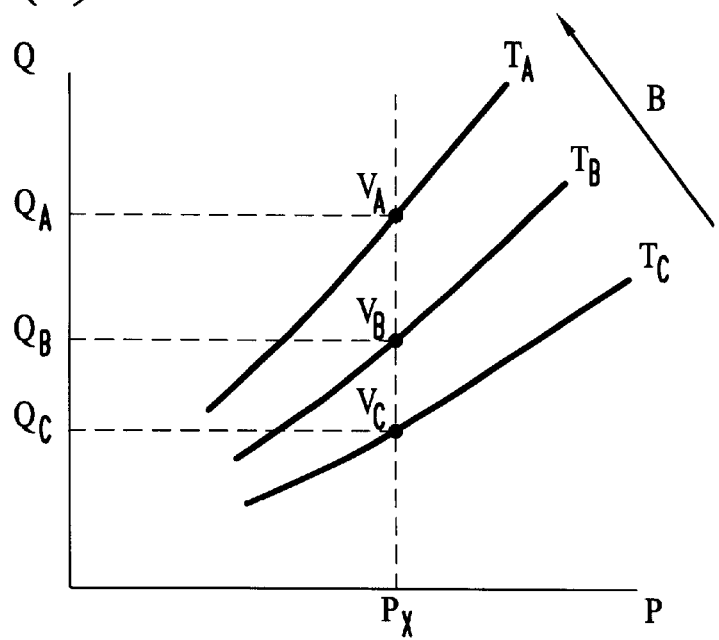
FIG. 5(a) is a graph showing a relationship between the hydraulic pressure and the oil flow rate based on the oil temperature and FIG. 5(b) is a graph showing a relationship between the oil temperature and the operating voltage of the electric oil pump.
Figure 5B:
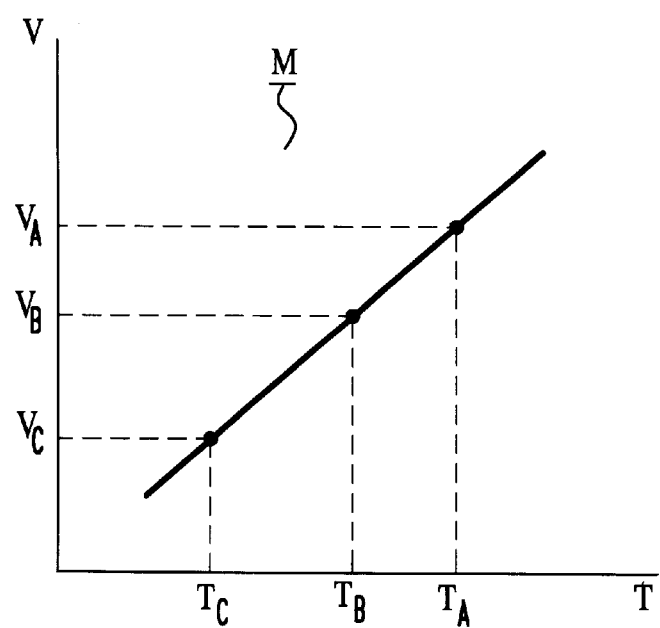

Next, relationship between the hydraulic pressure and flow rate as well as the relationship between the oil temperature and the operating voltage of the electric oil pump in the hydraulic controller 6 of the automatic transmission will be explained referring to FIGS. 5(a) and 5(b). In FIG. 5(a), an arrow B indicates the direction in which the oil temperature is increased, in other words, oil temperature $T_A$, oil temperature $T_B$, and oil temperature $T_C$ are in order of decreasing temperature.

As shown in FIG. 5(a), when the oil temperature is $T_A$, $T_B$ or $T_C$, the hydraulic pressure P supplied to the hydraulic controller 6 is substantially proportional to the flow rate Q of the and ATF. However, if the flow rate Q of the ATF remains unchanged the hydraulic pressure P varies according the oil temperature T caused by the characteristics of the automatic transmission and the change in viscosity resultant from the temperature change. In other words, in order to obtain the same hydraulic pressure P, the flow rate Q of the ATF must change in accordance with change in the oil temperature T. As an example, the hydraulic controller 6 requires a hydraulic pressure $P_X$ to engage the clutch C1. In order to obtain the hydraulic pressure $P_X$, a flow rate $Q_A$ needs to be supplied at the oil temperature $T_A$, while the same hydraulic pressure $P_X$ can be obtained by supplying a flow rate $Q_B$ at an oil temperature $T_B$, or supplying a flow rate $Q_C$ at the oil temperature $T_C$, respectively.

The flow rate Q output by the electric oil pump 8 can be determined based on the operating voltage V. Therefore, a substantially constant hydraulic pressure $P_X$, as required, is obtained by supplying an operating voltage $V_A$ when the flow rate $Q_A$ is required, an operating voltage $V_B$ when the flow rate $Q_B$ is required, and an operating voltage $V_C$ when the flow rate $Q_C$ is required, respectively. Then, as shown in FIG. 5(b), a map M of the relationship between the oil temperature T and the operating voltage V of the electric oil pump can be obtained. Since the map M is stored in the aforementioned control section 10 beforehand, the operating voltage control means 10b is able to determine the operating voltage V of the electric oil pump 8 based on the oil temperature T detected by the oil temperature detection means 10a, by referring to the map M.

Figure 6:
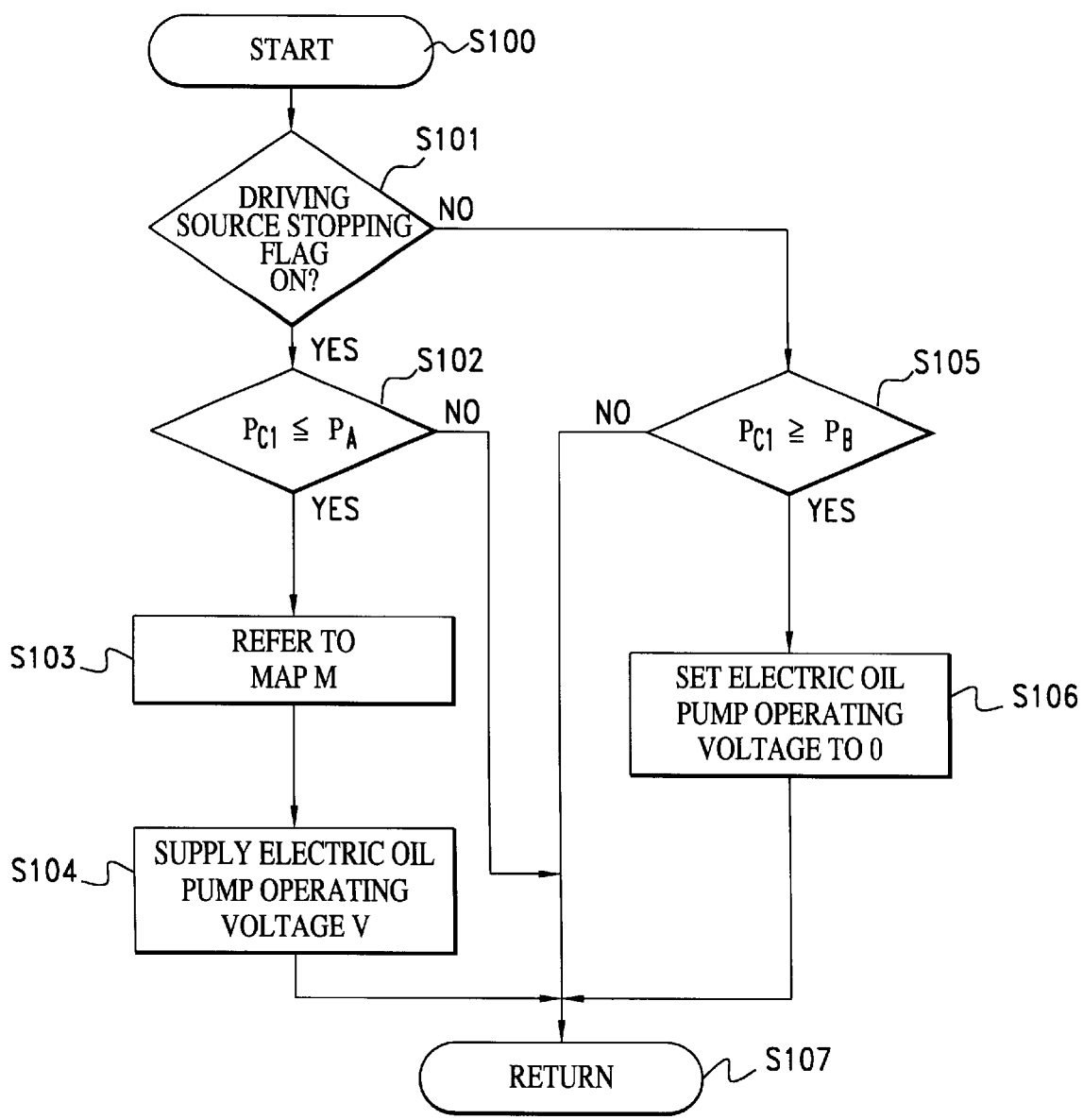
FIG. 6 is a flow chart of a control routine for drive control of the oil pump according to the present invention.
Figure 8:
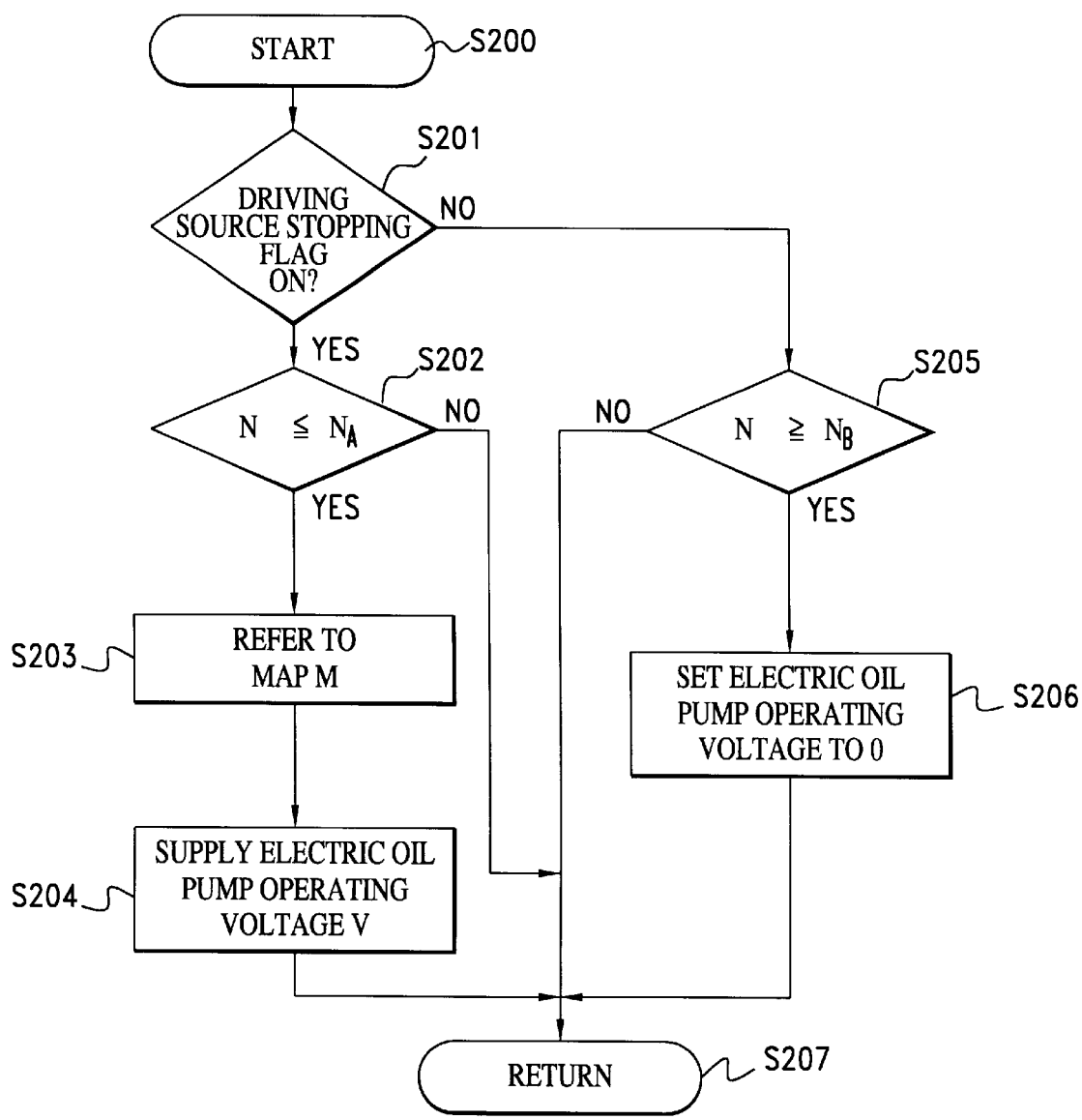
FIG. 8 is a flow chart of a control routine for operation of the oil pump based on the drive power source rotational speed N.

Next, operation of the control apparatus 1 according to the present invention will be explained referring to FIG. 6. In FIG. 6, "OFF" indicates that the oil pump is controlled such that one (or both) of the engine 2 and the motor/generator 3 is driven, and "ON" indicates that it is controlled such that both the engine 2 and the motor/generator 3 are stopped. For example, when a driver turns on an ignition switch by means of an ignition key, the control routine is started (S100), and will be continued until, for example, the ignition switch is turned off.

First, the control section 10 judges whether or not the driving power source stopping flag is ON based on, for example, a throttle opening or the like (S101). For example, in normal driving, where one (or both) of the engine 2 and the motor/generator 3 is driven, the control section 10 judges that the driving power source stopping flag is not ON. Then it judges whether or not the clutch hydraulic pressure $P_{C1}$ detected by the hydraulic pressure sensor 14 is equal to or greater than a second predetermined threshold value $P_B$ (S105). When either of the engine 2 and the motor/generator 3 is driven, a hydraulic pressure is supplied from the mechanical oil pump 7, and therefore, the clutch hydraulic pressure $P_{C1}$ is equal to or greater than the second predetermined threshold value $P_B$. Consequently, the routine returns (S107) after the electric oil pump drive control means 10b has stopped the oil pump 8 (S106).

Meanwhile, since the clutch hydraulic pressure $P_{C1}$ is detected by the hydraulic pressure sensor 14 in this embodiment, the hydraulic pressure supplied to the clutch C1 to be engaged, for example, at the start of driving, is able to be correctly detected. This enables the hydraulic pressure $P_X$ required for engaging the clutch C1, especially at the start of driving, to be maintained. Moreover, the clutch hydraulic pressure $P_{C1}$ is detectable irrespective of a change in oil temperature or the like.

If the oil pump is controlled such that both the engine 2 and the motor/generator 3 are stopped based on, for example, the throttle opening or the like, the control section 10 judges that the driving power source stopping flag is ON (S101), and then judges whether or not the clutch hydraulic pressure $P_{C1}$ is equal to or less than a first predetermined threshold value $P_A$ (S102). Immediately after that the engine 2 or the motor/generator 3 is controlled to stop, the rotational speed of the engine 2 or the motor/generator 3 gradually decreases, and therefore, the mechanical oil pump 7 is gradually stopped, that is, the hydraulic pressure supplied from the mechanical oil pump 7 gradually decreases, leaving sufficient hydraulic pressure. Therefore, the clutch hydraulic pressure $P_{C1}$ is equal to or greater than the first predetermined threshold value $P_A$. Consequently, the routine returns (S107) after the electric oil pump drive control means 10b has stopped the oil pump 8.

While the aforementioned steps S100, S101, S102, and S107 are repeated, the clutch hydraulic pressure $P_{C1}$ decreases to a value equal to or less than the first predetermined threshold value $P_A$, which is detected in Step S102. In this case, first, the oil temperature detection means 10a detects the oil temperature T in the hydraulic controller 6, and the control section 10 calculates the operating voltage V, while referring to the aforementioned map M based on the thus detected oil temperature T (S103). Next, the electric oil pump drive control means 10b duty controls the operating voltage V based on the calculated result and supplies that controlled voltage to the electric oil pump 8 (S104). In other words, the electric oil pump drive control means 10b drives the electric oil pump 8 and supplies the aforementioned hydraulic controller 6 with a hydraulic pressure based on the operating voltage V.

Subsequently, when the engine 2 or the motor/generator 3 is driven again, the control section 10 judges that the driving power source stopping flag is not ON (S101), and then judges whether or not the clutch hydraulic pressure $P_{C1}$ is equal to or greater than the second predetermined threshold value $P_B$ (S105). The second predetermined threshold value $P_B$ is set higher than the first predetermined threshold value $P_A$ (to be explained later in detail), and the clutch hydraulic pressure $P_{C1}$ is maintained at a level less than the second predetermined threshold value $P_B$. Therefore, the electric oil pump 8 is maintained in a driven state and the routine returns (S107). Consequently, even when the vehicle is in a stopped state where the driving power source (the engine 2 and/or the motor/generator 3) has been stopped, the electric oil pump 8 generates a hydraulic pressure based on the operating voltage V and the hydraulic pressure is applied to the hydraulic controller 6 of the automatic transmission. The vehicle starts in this state without any trouble, because the automatic transmission, that is, the torque converter 4, the clutch C1, and the like, function normally with the hydraulic pressure generated by the electric oil pump 8. In addition, since the engine 2 or the motor/generator 3 is driven, the mechanical oil pump 7 is also driven, and the clutch hydraulic pressure $P_{C1}$ is increased accordingly. When the clutch hydraulic pressure $P_{C1}$ becomes equal to or greater than the second predetermined threshold value $P_B$ (S105), the electric oil pump drive control means 10b sets the operating voltage to 0 (S106), in other words, stops the electric oil pump 8 and the routine returns (S107), such that the driving state of the vehicle returns to the aforementioned normal driving state.

As shown in FIG. 7(a), when the driving power source stopping flag is OFF at time to, one (or both) of the engine 2 and the motor/generator 3 is being driven (S101), and therefore, the mechanical oil pump 7 is being driven. Consequently, as shown in FIG. 7(b), the clutch hydraulic pressure $P_{C1}$ supplied to the hydraulic control apparatus for the automatic transmission is maintained at a substantially constant hydraulic pressure $P_Y$ which is higher than the second predetermined threshold value $P_B$ (S105). In this case, as shown in FIG. 7(c), the operating voltage of the electric oil pump 8 is 0 (S106), that is, the electric oil pump 8 is stopped.

When both the engine 2 and the motor/generator 3 are stopped at a time t1, and the driving power source stopping flag is turned ON as shown in FIG. 7(a) (S101), the mechanical oil pump 7 is also stopped. However, as described above, there is a sufficient residual hydraulic pressure supplied from the mechanical oil pump 7. Therefore, the clutch hydraulic pressure $P_{C1}$ is maintained at a value greater than the first predetermined threshold value $P_A$ (S102). Moreover, the oil pump is controlled such that the mechanical oil pump 7 and the electric oil pump 8 are controlled to stop and the clutch hydraulic pressure $P_{C1}$ gradually decreases and becomes equal to or less than the first predetermined threshold value $P_A$ at a time t2 (S102). Subsequently, the electric oil pump drive control means 10b refers to the map M as shown in FIGS. 5(b) and, based on the oil temperature T detected by the oil temperature detection means 10a (S103), supplies the electric oil pump 8 with the operating voltage V which is duty controlled as shown in FIG. 7(c) so as to drive the electric oil pump 8 (S104).

In some cases, while the operating voltage V is supplied to the electric oil pump 8, the voltage of the battery 11 may vary due to, for example, a change of the amount of charge. In this case, the battery voltage detection means 10c detects the voltage of the battery 11 and the electric oil pump control means duty controls the voltage of the battery 11 so that the voltage of the battery 11 becomes a voltage (for example, $V_A$, $V_B$, $V_C$) based on the aforementioned map M. In other words, the voltage of the battery 11 is controlled to be a stable operating voltage V so that the hydraulic pressure supplied from the electric oil pump 8 is maintained at the required hydraulic pressure $P_X$. Consequently, the stable hydraulic pressure $P_X$ required for the hydraulic controller can be maintained irrespective of the voltage of the battery 11.

If the oil temperature is the oil temperature $T_C$, which is low, for example when the engine 2 is stopped immediately after it has been started, the electric oil pump operating voltage $V_C$ as shown by a solid line in FIG. 7(c) is supplied by the aforementioned control routine (S103, S104). On the other hand, if the oil temperature increases, for example, by heat of the engine 2 or the like, to the oil temperature $T_B$ or $T_A$, the electric oil pump operating voltage $V_B$ or $V_A$ shown by a dashed line in FIG. 7(c) is supplied. That is, the clutch hydraulic pressure $P_{C1}$ supplies the hydraulic pressure $P_X$ required for the hydraulic control (for engaging the clutch C1) irrespective of a change of the oil temperature T and, at the same time, it also prevents generation of a greater hydraulic pressure than is required, enabling the load on the electric oil pump 8 to be decreased. This decreases the electric power consumption of the electric motor M1 of the electric oil pump 8, and prevents a decrease in the amount of charge of the battery, thereby increasing the operation time. At the same time, it improves the durability of the electric oil pump 8 and the electric motor M1. Furthermore, since the load on the electric oil pump 8 is decreased, the electric oil pump 8 can be made more compact. Moreover, for example, in a hybrid vehicle, since the electric power consumption is decreased as described above, the drive time of the motor/generator 3 is increased, which improves fuel economy and reduces exhaust emissions.

Subsequently, as shown in FIG. 7(b), the residual hydraulic pressure supplied from the mechanical oil pump 7 runs out such that the clutch hydraulic pressure $P_{C1}$ consists of only the hydraulic pressure supplied from the electric oil pump 8. Thus, the clutch hydraulic pressure $P_{C1}$ is maintained at the substantially constant hydraulic pressure $P_X$ required for the hydraulic control of the automatic transmission. When the electric oil pump 8 is driven with a high residual hydraulic pressure supplied from the mechanical oil pump 7, a load is generated on the electric oil pump 8. Alternatively, when the electric oil pump 8 is driven after it has run out of the residual hydraulic pressure supplied from the mechanical oil pump 7, the clutch hydraulic pressure $P_{C1}$ becomes lower than the hydraulic pressure $P_X$ required for the hydraulic control. In this case, the first predetermined threshold value $P_A$ for starting supply of the operating voltage V to the electric oil pump 8 is set at a certain pressure at which the residual hydraulic pressure supplied from the mechanical oil pump 7 has decreased sufficiently and the clutch hydraulic pressure $P_{C1}$ can maintain the hydraulic pressure $P_X$.

When the hydraulic pressure is supplied from the electric oil pump 8, the clutch hydraulic pressure $P_{C1}$ temporarily increases and is combined with the residual hydraulic pressure supplied from the mechanical oil pump 7. However, since the second predetermined threshold value $P_B$ is set at a certain value higher than the first predetermined threshold value $P_A$ so that, even in this case, the highest value A of the clutch hydraulic pressure $P_{C1}$, for example, does not exceed the second predetermined threshold value $P_B$, preventing the electric oil pump 8 from accidentally being stopped and driven again, i.e., so-called hunting. Further, even if the first predetermined threshold value $P_A$ and the second predetermined threshold value $P_B$ are set to be the same value, for example, the electric oil pump 8 is driven based on the first predetermined threshold value $P_A$ with the driving power source stopping flag ON, and it is stopped based on the second predetermined threshold value $P_B$ with the driving power source stopping flag OFF. This prevents the electric oil pump 8 from accidentally being stopped when the driving power source is stopped, or from accidentally being driven when the driving power source is driven. In other words, this prevents "hunting."

At time t3 as shown in FIG. 7(a), when one (or both) of the engine 2 and the motor/generator 3 is driven, the mechanical oil pump 7 is also driven and the driving power source stopping flag is turned OFF (S101). In this case, as shown in FIGS. 7(b) and 7(c), although the mechanical oil pump 7 is driven by the clutch hydraulic pressure $P_{C1}$, the sharp rise in the hydraulic pressure supplied from the mechanical oil pump 7 is delayed for a certain period of time due to resistance of the hydraulic circuit or the like. During this period of the time, the clutch hydraulic pressure $P_{C1}$ is supplied. That is, the electric oil pump operating voltage V is supplied. In other words, the driving of the electric oil pump 8 is maintained such that the hydraulic pressure $P_X$ is supplied. Although the hydraulic pressure $P_X$ increases combined with the driving of the electric oil pump 8, the hydraulic pressure $P_X$ has not reached the second predetermined threshold value $P_B$ (S105), the electric oil pump operating voltage V is continuously supplied. Further, the hydraulic pressure supplied from the mechanical oil pump 7 sharply rises after a delay of a certain period of time. When the clutch hydraulic pressure $P_{C1}$ becomes equal to or greater than the second predetermined threshold value $P_B$ at time t4 (S105), the electric oil pump operating voltage V is set to 0 and the electric oil pump 8 is stopped (S106). After that, the hydraulic pressure is supplied from the mechanical oil pump 7, that is, the vehicle moves into a normal driving state.

Meanwhile, when the driving of the electric oil pump 8 is stopped at the same time the driving power source is driven, for example, the hydraulic pressure $P_{C1}$ may become lower than the hydraulic pressure $P_X$ required for the hydraulic control of the automatic transmission. In this case, the second predetermined threshold value $P_B$ is set at a value where the electric oil pump 8 is stopped when the hydraulic pressure from the mechanical oil pump 7 increases to a value which is high enough to maintain the required hydraulic pressure $P_X$.

In the aforementioned embodiment, the hydraulic pressure generated by the mechanical oil pump 7 is supplied to the hydraulic controller 6, and therefore, the driving power source is stopped. When the electric oil pump 8 needs to be driven, the determined operating voltage V may be supplied to the electric oil pump 8, thereby decreasing the load on the electric oil pump 8.

In the aforementioned embodiment, a vehicle equipped with a mechanical oil pump interlocked with the driving power source was explained. However, the vehicle does not necessarily have to be equipped with the mechanical oil pump. Further, any control apparatus is possible as long as an operating voltage is supplied to an electric oil pump based on an oil temperature so as to maintain a required hydraulic pressure.

Next, an embodiment which is a modification of the aforementioned embodiment will be explained referring to the drawings. In the following embodiment, the explanation of features which are similar to features in the aforementioned embodiment will be omitted.

As described above, the mechanical oil pump 7 is driven interlocked with the engine 2 and the motor/generator 3, via the torque converter 4. Therefore, even if, for example, the hydraulic controller 6 of the automatic transmission is not, or be cannot be, provided with the hydraulic pressure sensor 14, the rotational speed of the engine 2 or of the motor/generator 3 (hereafter referred to as the "driving power source rotational speed") N corresponding to the first and second predetermined threshold values in the first embodiment as above, can be obtained from the relationship between the driving power source rotational speed N and the clutch hydraulic pressure $P_{C1}$ supplied from the mechanical oil pump 7 and the electric oil pump 8, with the oil temperature taken into consideration. Further, the electric oil pump drive control means 10b can control the electric oil pump 8 so as to drive or stop it based on the driving power source rotational speed N.

Hereafter, control of the drive control apparatus for the oil pump based on the driving power source rotational speed N will be explained referring to FIG. 8 and FIGS. 9(a)–9(d).

First, when the control routine is started (S200), the control section 10 detects the driving power source rotational speed N based on signals from the magnetic pole position detection sensor 12 and the engine rotational speed sensor 15, and detects the oil temperature T by means of the oil temperature sensor 13. As described above, the relationship between the flow rate Q of the ATF and the hydraulic pressure P varies due to a characteristic of the automatic transmission and due to a change in viscosity with change in the oil temperature or the like (see FIG. 5(a)). Meanwhile, the flow rate Q of the ATF of the mechanical oil pump 7 is determined based on the driving power source rotational speed N. Accordingly, the driving power source rotational speed N for driving or stopping the electric oil pump 8 can be calculated from the required hydraulic pressure $P_X$ and the ATF temperature, by storing beforehand the relationship between the clutch hydraulic pressure $P_{C1}$, which is based on the oil temperature T, and the driving power source rotational speed N in the control portion 10.

As shown in FIG. 9, when the driving power source stopping flag is OFF at time t0, one (or both) of the engine 2 and the motor/generator is being driven (S201), and the mechanical oil pump 7 is also being driven. Then, as shown in FIG. 9(b), the driving power source rotational speed N is maintained at a substantially constant rotational speed higher than the second predetermined threshold rotational speed $N_B$ (S205). As shown in FIG. 9(c), the clutch hydraulic pressure $P_{C1}$ is maintained at a constant hydraulic pressure $P_Y$ which is higher than the second predetermined threshold value $P_B$. Therefore, as shown in FIG. 9(d), the electric oil pump operating voltage V is set to 0, and the electric oil pump 8 is stopped (S206).

As shown in FIG. 9(a), when the oil pump is controlled such that the engine 2 and the motor/generator 3 are stopped at a time t1, the driving power source stopping flag is turned ON, and it is judged that the driving power source stopping flag is ON (S201). However, as shown in FIGS. 9(b) and 9(c), since the driving power source rotational speed N, which is a rotational speed of the engine 2 or the motor/generator 3, is decreasing gradually, the driving power source rotational speed N is greater than the first predetermined threshold value $N_A$ (S202). In addition, the residual hydraulic pressure supplied from the mechanical oil pump 7 is sufficient, and thus the clutch hydraulic pressure $P_{C1}$ is maintained equal to or greater than the first predetermined threshold value $P_A$. Further, the oil pump is controlled such that both the engine 2 and the motor/generator 3 are stopped, whereby the driving power source rotational speed N decreases gradually so as to become equal to or less than the first predetermined threshold rotational speed $N_A$, at a time 2 (S202). Moreover, the clutch hydraulic pressure $P_{C1}$ also decreases gradually and becomes equal to or less than the first predetermined threshold value $P_A$. The electric oil pump drive control means 10b refers to the map M (S203), and as shown in FIG. 9(d), and the electric oil pump operating voltage V is supplied (S204) so as to drive the electric oil pump 8.

In addition, when the voltage of the battery 11 varies due to, for example, a change in the amount of charge while the operating voltage V is supplied to the electric oil pump 8, the aforementioned battery voltage detection means 10c detects the voltage of the battery 11, and the voltage of the battery 11 is duty controlled so that it becomes a voltage (such as, $V_A$, $V_B$, $V_C$) based on the aforementioned map M. In other words, the voltage of the battery 11 is controlled to be a stable operating voltage V so that the hydraulic pressure supplied from the electric oil pump 8 is maintained at the required hydraulic pressure $P_X$. Consequently, the hydraulic pressure $P_X$ required for the hydraulic control apparatus can be maintained irrespective of the voltage of the battery 11.

As in the case of the aforementioned embodiment, if the oil temperature is the oil temperature $T_C$, which is low, in a case, for example, where the engine 2 is stopped immediately after it has been started, the electric oil pump operating voltage $V_C$ shown by a solid line in FIG. 9(d) is supplied by the control routine (S203, S204) as above. Meanwhile, when the oil temperature increases, for example by heat of the engine 2 or the like, to the oil temperature $T_B$ or $T_A$, and the electric oil pump operating voltage $V_B$ or $V_A$ shown by a dashed line in FIG. 9(d) is supplied. That is, while the clutch hydraulic pressure $P_{C1}$ supplies the hydraulic pressure $P_X$ required for the hydraulic control (for engaging the clutch C1), irrespective of a change of the oil temperature T, it also prevents generation of a greater hydraulic pressure than is required, thus enabling the load on the electric oil pump 8 to be decreased. This decreases the electric power consumption of the electric motor M1 of the electric oil pump 8, and prevents a decrease of the amount of charge of the battery, thereby increasing the operation time. At the same time, the durability of the electric oil pump 8 and the electric motor M1 can be improved. Furthermore, since the load on the electric oil pump 8 decreases, the electric oil pump 8 can be made more compact. Moreover, for example in a hybrid vehicle, since the electric power consumption is decreased as described above, the drive time of the motor/generator 3 can be increased, thereby improving fuel economy and reducing exhaust emissions.

Subsequently, as shown in FIGS. 9(b) and 9(c), when the driving power source rotational speed N becomes 0 and the driving power source is stopped, the clutch hydraulic pressure $P_{C1}$, consists of only the hydraulic pressure supplied from the electric oil pump 8 because the residual hydraulic pressure supplied from the mechanical oil pump 7 has run out, and is maintained at a substantially constant hydraulic pressure $P_X$ required for the hydraulic control of the automatic transmission.

When the electric oil pump 8 is driven with a high residual hydraulic pressure supplied from the mechanical oil pump 7, a load is generated on the electric oil pump 8. Alternatively, when the electric oil pump 8 is driven after it has run out of the residual hydraulic pressure supplied from the mechanical oil pump 7, the clutch hydraulic pressure $P_{C1}$ becomes lower than the hydraulic pressure $P_X$ required for the hydraulic control. In this case, the first predetermined threshold rotational speed $N_A$ for starting supply of the operating voltage V to the electric oil pump 8 is set at a certain pressure at which the residual hydraulic pressure supplied from the mechanical oil pump 7 has decreased sufficiently and the clutch hydraulic pressure $P_{C1}$ can maintain the hydraulic pressure $P_X$.

When the hydraulic pressure is supplied from the electric oil pump 8, the clutch hydraulic pressure $P_{C1}$ increases temporarily combined with the residual hydraulic pressure supplied from the mechanical oil pump 7. However, even in this case, since the second predetermined threshold rotational speed $N_B$ is set at a certain value higher than the first predetermined threshold rotational speed $N_A$, as in the case where the second predetermined threshold value $P_B$ is set at a certain value higher than the first predetermined threshold value $P_A$, the highest value A, for example, does not exceed the second predetermined threshold value $P_B$, preventing the electric oil pump 8 from accidentally being stopped and driven again, i.e., preventing hunting. Further, even if the first predetermined threshold rotational speed $N_A$ and the second predetermined threshold rotational speed $N_B$ are set to be the same value, for example, the electric oil pump 8 is driven based on the first predetermined threshold rotational speed $N_A$ with the driving power source stopping flag being in the ON state, and is stopped based on the second predetermined threshold rotational speed $N_B$ with the driving power source stopping flag OFF. This prevents the electric oil pump 8 from accidentally being stopped when the driving power source is stopped, or from accidentally being driven when the driving power source is driven. In other words, this prevents hunting.

At time t3 as shown in FIG. 9(a), when one (or both) of the engine 2 and the motor/generator 3 is driven, the mechanical oil pump 7 is also driven and the driving power source stopping flag is turned OFF (S201). In this case, as shown in FIGS. 9(b) and 9(c), the driving power source rotational speed N increases gradually. The clutch hydraulic pressure $P_{C1}$ increases due to the combination of the driving of the mechanical oil pump 7 and the driving of the electric oil pump 8 so as to exceed the hydraulic pressure $P_X$. However, the driving power source rotational speed N is less than the second predetermined threshold rotational speed $N_B$ (S205) or, in other words, the clutch hydraulic pressure $P_{C1}$ has not reached the second predetermined threshold number $P_B$. Therefore, the driving of the electric oil pump 8 is continued. In this case, as in the aforementioned embodiment, the automatic transmission functions normally and starts without trouble utilizing the hydraulic pressure from the electric oil pump 8. Further, the hydraulic pressure supplied from the mechanical oil pump 7 sharply rises after a delay of a certain period of time. When the driving power source rotational speed N becomes equal to or greater than the second predetermined threshold rotational speed $N_B$ at a time point t4 (S205) and the clutch hydraulic pressure $P_{C1}$ becomes equal to or greater than the second predetermined threshold value $P_B$, the electric oil pump drive control means 10b sets the operating voltage to 0 and stops the electric oil pump 8 (S206). Then, the hydraulic pressure is supplied from the mechanical oil pump 7, that is, the vehicle returns to its normal driving state.

When the driving of the electric oil pump 8 is stopped at the same time the driving power source is stopped, for example, hydraulic pressure $P_{C1}$ may become lower than the clutch hydraulic pressure $P_X$ required for the hydraulic control of the automatic transmission. Therefore, the second predetermined threshold rotational speed $N_B$ is set at a value where the electric oil pump 8 is stopped when the hydraulic pressure from the mechanical oil pump 7 has increased to a value sufficient to maintain the required hydraulic pressure $P_X$.

In the aforementioned embodiment, a control apparatus according to the present invention is employed in a hybrid vehicle in which the driving power source is a combination of an engine and a motor/generator. However, the present invention is not limited to the above embodiment, and may be employed in any drive control apparatus as long as a hydraulic pressure is supplied from the electric oil pump and the hydraulic temperature is varied.

The invention may be embodied in other specific forms without departing from the spirit or essential characteristics thereof. The present embodiments are therefore to be considered in all respects as illustrative and not restrictive, the scope of the invention being indicated by the appended claims rather than by the foregoing description, and all changes which come within the meaning and range of equivalency of the claims are therefore intended to be embraced therein.

What is claimed is:

1. A control apparatus for generating a hydraulic pressure for hydraulic control of an automatic transmission in a vehicle having a driving power source, the automatic transmission having a hydraulic controller which performs a shift change through engagement-disengagement of a plurality of friction engagement elements responsive to the hydraulic pressure, said control apparatus comprising:

an electric oil pump;

oil temperature detection means for detecting an oil temperature of oil supplied to the friction engagement elements of the hydraulic controller;

electric oil pump drive control means for driving the electric oil pump based on the oil temperature detected by the oil temperature detection means, so that a hydraulic pressure required for the control of the automatic transmission is maintained; and a mechanical oil pump which is driven by the driving power source and which supplies at least a portion of the hydraulic pressure supplied to the hydraulic controller.

2. A control apparatus for an oil pump according to claim 1, further comprising:

a speed detector for detecting rotational speed of the driving power source; and judgement means for determining a hydraulic pressure required to be maintained, based on the detected rotational speed of the driving power source.

3. A control apparatus according to claim 1, further comprising:

a battery which supplies a current for driving the electric oil pump, and battery voltage detection means for detecting a voltage of the battery; and wherein the electric oil pump drive control means drives the electric oil pump by supplying the electric oil pump with an operating voltage determined based on the voltage detected by the battery voltage detection means and the oil temperature detected by the oil temperature detection means so that the hydraulic pressure required for the hydraulic control of the automatic transmission is maintained.

4. A control apparatus according to claim 1, further comprising:

a pressure detector for detecting a hydraulic pressure supplied to the friction engagement elements; and judgement means for determining a hydraulic pressure required to be maintained, based on the detected hydraulic pressure supplied to the friction engagement elements of the automatic transmission.

5. A control apparatus for an oil pump according to claim 1, wherein the driving power source comprises an engine and a motor for transmitting a driving force to an input shaft of the automatic transmission, and the vehicle is a hybrid vehicle in which the engine and the motor are freely driven and stopped in accordance with a driving state.

* * * * *